United States Patent
Matsui et al.

[11] Patent Number: 5,907,521
[45] Date of Patent: *May 25, 1999

[54] ULTRASONIC RANGE FINDER USING ULTRASONIC SENSOR

[75] Inventors: Yasuharu Matsui, Toyama; Jun Tabota; Keiichi Kami, both of Toyama-ken, all of Japan

[73] Assignee: Murata Manufacturing Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/668,386

[22] Filed: Jun. 21, 1996

[30] Foreign Application Priority Data

Jun. 23, 1995 [JP] Japan ................................ 7-158013
Jun. 23, 1995 [JP] Japan ................................ 7-158014
Aug. 7, 1995 [JP] Japan ................................ 7-200794

[51] Int. Cl.$^6$ ............................ G01S 15/00; H04R 17/00
[52] U.S. Cl. ........................... 367/162; 367/99; 367/176; 310/327
[58] Field of Search ............................ 367/99, 162, 165, 367/173, 176, 188; 310/327; 73/629, 632, 649

[56] References Cited

U.S. PATENT DOCUMENTS

| | | | |
|---|---|---|---|
| 4,528,652 | 7/1985 | Horner et al. | 367/162 |
| 4,549,107 | 10/1985 | Kaneko et al. | 310/327 |
| 4,739,860 | 4/1988 | Kobayashi et al. | 367/99 |
| 4,780,861 | 10/1988 | Stembridge et al. | 367/176 |
| 5,176,140 | 1/1993 | Kami et al. | 310/327 |

*Primary Examiner*—Ian J. Lobo
*Attorney, Agent, or Firm*—Ostrolenk, Faber, Gerb & Soffen, LLP

[57] ABSTRACT

An ultrasonic range finder which can effectively suppress the influence of direct transmission waves is provided. An ultrasonic range finder according to the present invention comprises a transmitting ultrasonic sensor, a receiving ultrasonic sensor, and a case which holds both ultrasonic sensors mounted and separated on the same surface, wherein a foam member fabricated to contain air bubbles is provided between the ultrasonic sensors within the case and the foam member is exposed to the surface of the case. Each of the sections of the transmitting and receiving ultrasonic sensors (which are held within the case) are covered with a second foam member and the matching layer sections of the transmitting and receiving ultrasonic sensors project beyond the surface of the case.

18 Claims, 4 Drawing Sheets

ULTRASONIC RANGE FINDER USING ULTRASONIC SENSOR

BACKGROUND OF THE INVENTION

The present invention relates to an ultrasonic range finder having a transmitting ultrasonic sensor and a receiving ultrasonic sensor, and, more particularly, a technique for suppressing the influence of direct transmission waves propagating from the transmitting ultrasonic sensor to the receiving ultrasonic sensor.

In addition, the present invention relates to an ultrasonic sensor, and, more particularly, to a technique for attenuating direct transmission waves propagating within a case by improving a holder structure of an ultrasonic vibrator.

Furthermore, the present invention relates to an ultrasonic vibrator, and, more particularly, to a material for fabricating an acoustic matching layer.

SUMMARY OF THE INVENTION

Conventionally, as disclosed in Published Unexamined Utility Model Application No. H1-158987, an ultrasonic range finder includes a transmitting ultrasonic sensor for transmitting ultrasonic waves to an object to be inspected, a receiving ultrasonic sensor for receiving waves reflected from the object to be inspected, and a resin case for integrally housing and holding both sensors which are separated and positioned on the same surface. In this ultrasonic range finder, a recess is formed between the transmitting and receiving sensors within the case as a bypass route for attenuating mechanical vibration generated in the transmitting sensor so as to prevent influence of direct transmission of such mechanical vibration to the receiving sensor through the case, that is, influence of so-called direct transmission waves.

When the ultrasonic range finder with a conventional arrangement is used in an environment where water is present, the water may penetrate into the recess formed in the case, and the recess will be blocked by the water so that vibrations cannot be attenuated and the direct transmission wave affects the receiving sensor. The fact that the vibration cannot be attenuated due to the presence of water is because the acoustic impedance of the resin constituting the case is about $1.7 \times 10^6$ kg/m$^2$s, while water has an acoustic impedance of about $1.4 \times 10^6$ kg/m$^2$s. In addition, adhesives used in assembling the ultrasonic range finder may penetrate into the recess of the case and solidify. Thus, it is the present status that the influence of direct transmission waves cannot be suppressed only by forming the recess.

The present invention is made in view of the above and is intended to provide an ultrasonic range finder which can more reliably suppress the undesirable influence of direct transmission waves.

Although not shown, some ultrasonic sensors have a structure in which an ultrasonic vibrator consisting of an acoustic matching layer and a vibrator are surrounded by a holder member such as rubber and are mounted on resin cases (hereinafter called the "first conventional example"). In this case, as described in Published Unexamined Utility Model Application No. H5-74099, the vibrator is a piezoelectric vibrator element attached on the back surface of an acoustic matching layer made of resin and a metal tube (such as aluminum) which contains the piezoelectric vibrator element and supports the acoustic matching layer.

Alternatively, as disclosed in Published Examined Utility Model Application No. H6-22232, an ultrasonic sensor has a structure in which adhesives such as foam silicon sponge or epoxy are partially positioned between the outer side of an ultrasonic vibrator and a case containing and holding the ultrasonic vibrator (hereinafter called the "second conventional example"). In this ultrasonic sensor, water-proof treatment is provided on the exposed surface of the foam silicon sponge to prevent water from penetrating through the exposed surface of the foam silicon sponge.

The ultrasonic vibrator in such an ultrasonic sensor typically has a structure in which the piezoelectric vibrator element is connected to the acoustic matching layer. When such a structure is employed, since ultrasonic waves are emitted from the entire surface of the ultrasonic vibrator, the ultrasonic waves emitted from the ultrasonic vibrator are converted into direct transmission waves and propagate inside the case. However, in the ultrasonic range finder or the like having a pair of transmitting and receiving ultrasonic sensors, if the direct transmission waves emitted from the transmitting ultrasonic sensor propagate inside the case, and are detected by the receiving ultrasonic sensor, the disadvantage of faulty measurements results. Thus, a technique is needed which can effectively attenuate the direct transmission waves inside the case which holds the ultrasonic sensors.

It is well known in the art that ultrasonic waves are reflected at a position where the acoustic impedance of a material carrying the transmitted waves changes, and the transmitted ultrasonic waves are attenuated by the amount of reflection. However, since the rubber material serving as the holding member in the first conventional example has an acoustic impedance much the same as the resin material forming the acoustic matching layer or the case, sufficient attenuation of the direct transmission wave cannot be attained despite that the outer periphery of the ultrasonic vibrator is surrounded by a holding material such as rubber. Here, the acoustic impedance of the resin material is about $1.7 \times 10^6$ kg/m$^2$s, and that of the rubber material is about $1.4 \times 10^6$ kg/m$^2$s.

In the second conventional example, when the outer periphery of the ultrasonic vibrator is partially surrounded by the foam silicon sponge, an attenuation effect is obtained based on the difference of the acoustic impedance and the amount of foam silicon sponge which is used. However, if water is present in the air bubbles in the foam silicon sponge, the acoustic impedance will be much the same as the resin material and, therefore, it will be difficult to attain stable attenuation of the direct transmission wave. To prevent water from penetrating the foam silicon sponge, it is necessary to perform water-proofing, which is costly and time consuming. The acoustic impedances of foam silicon sponge, epoxy type adhesives, and water are about $0.2 \times 10^6$ kg/m$^2$s or less, $2.4 \times 10^6$ kg/m$^2$s or less, and $1.4 \times 10^6$ kg/m$^2$s or less, respectively.

The present invention is made in view of the above, and is intended to provide an ultrasonic sensor of a configuration in which direct transmission waves transmitted inside the case can be sufficiently attenuated even when water is present.

In addition, an ultrasonic vibrator is used in an ultrasonic sensor for distance measurements. Some ultrasonic vibrators comprise, although not shown, an acoustic matching layer, a piezoelectric vibrator element and a support tube which are coupled to one surface of the acoustic matching layer. The acoustic matching layer, as disclosed in Published Unexamined Patent Application No. S59-171295 and Published Examined Utility Model Application No. H1-41279, is typically formed by binding epoxy or silicon resin containing fine hollow balls of glass or carbon in a planar form.

It has been found that the transmission efficiency of ultrasonic waves in air is maximized when the acoustic impedance $Z3$ of the acoustic matching layer is equal to $(Z1 \times Z2)^{1/2} = 0.11 \times 10^6$ kg/m$^2$s, where the acoustic impedance of air $Z1$ is $0.0004 \times 10^6$ kg/m$^2$s and the acoustic impedance of a piezoelectric vibrator $Z2$ is $30 \times 10^6$ kg/m$^2$s. That is, the sensitivity of the ultrasonic vibrator is maximized. Thus, it is conventional to fabricate an acoustic matching layer using a material which provides an acoustic impedance of about $0.9$–$1.4 \times 10^6$ kg/m$^2$s, and to make the thickness of the acoustic matching layer about ¼ of the wavelength of the ultrasonic wave.

However, when an investigation is made of the receiving sensitivity of an ultrasonic vibrator which comprises an acoustic matching layer which contains bound, fine, hollow balls of glass with epoxy resin and which has an acoustic impedance of about $1.4 \times 10^6$ kg/m$^2$s, sensitivities as shown by the solid line in FIG. 6 result. Thus, the investigation reveals that when the acoustic impedance of the acoustic matching layer approaches the ideal value, the variation in the sensitivity of the ultrasonic vibrator is increased as a function of the working frequency.

When the sensitivity of the ultrasonic vibrator varies significantly, errors in the measurements of reflection times for objects to be measured for distance is increased. Thus, the accuracy of the measured distance to the object is lowered because the calculation is based on the reflection time. As shown in FIG. 7, when an ultrasonic wave signal A is output from a transmitting ultrasonic vibrator, if the sensitivity is not lowered, a relatively large reflected signal B is input into a receiving ultrasonic vibrator thereby exceeding a threshold value S in a relatively short time T. However, if the sensitivity is lowered, a smaller reflected wave B' is obtained, and the reflecting time T' is delayed until the reflected wave B' exceeds the threshold value S.

Therefore, to improve the accuracy of distance measurements using the ultrasonic vibrator of the conventional arrangement, it is necessary to (1) suppress the variation of the vibration in the ultrasonic vibrator by improving the accuracy of processing the thickness of the acoustic matching layer; (2) adjust the frequency of the transmission circuit for driving the transmitting ultrasonic vibrator to match the characteristics of the ultrasonic vibrator; or (3) sense and correct the frequency shifts in the ultrasonic sensor due to temperature changes. Thus, there arises the disadvantage that the ultrasonic vibrator or the transmission and receiving circuits become expensive.

The present invention is made in view of the above and is intended to provide an ultrasonic vibrator which provides relatively stable sensitivity and which can easily improve the accuracy of distance measurements.

A first ultrasonic range finder according to the present invention comprises a transmitting ultrasonic sensor, a receiving ultrasonic sensor, and a case for holding the ultrasonic sensors, wherein a foam member fabricated to contain air bubbles is provided between the ultrasonic sensors within the case. A second ultrasonic range finder is similar to the first ultrasonic range finder, but has a second foam member fabricated to contain air bubbles which surrounds part of the transmitting and receiving ultrasonic sensors held in the case.

In addition, a third ultrasonic range finder is similar to the first and second ultrasonic range finders, but the acoustic matching layers of the transmitting and receiving ultrasonic sensors project outward from the surface of the case. Further, a fourth ultrasonic range finder comprises a transmitting ultrasonic sensor, a receiving ultrasonic sensor, a case which has both ultrasonic sensors mounted and separated on the same surface, acoustic matching layers of the transmitting and receiving ultrasonic sensors projecting outward from the surface of the case, and a projecting member which projects outward from between the ultrasonic sensors on the surface of the case.

A first ultrasonic sensor according to the present invention comprises an ultrasonic vibrator containing an acoustic matching layer and a vibrator body, a case for housing and holding the ultrasonic vibrator in which only the top surface of the acoustic matching layer is exposed, and a foam member arranged to surround the ultrasonic vibrator housed in the case, wherein the foam member contains air bubbles.

In addition, a second ultrasonic sensor comprises an ultrasonic vibrator containing an acoustic matching layer and a vibrator body, a case for housing and holding the ultrasonic vibrator in which only the acoustic matching layer is exposed, and a foam member arranged to surround the ultrasonic vibrator housed in the case, wherein the foam member contains air bubbles.

An ultrasonic vibrator according to the present invention comprises an acoustic matching layer, a piezoelectric vibrator element and a support tube which are coupled to one surface of the acoustic matching layer, wherein the acoustic matching layer is made from a resin material providing an acoustic impedance of about $1.5$–$1.8 \times 10^6$ kg/m$^2$s. Such resin materials include Noryle or ABS (acrylonitrile-butadiene-styrene copolymer).

According to the first arrangement, since the foam member fabricated to contain air bubbles is interposed between the transmitting and receiving ultrasonic sensors, the foam member serves as a bypass route for attenuating mechanical vibrations of the transmitting ultrasonic sensor. Thus, the influence of a direct transmission wave propagated through the case can be effectively suppressed. Further, since water or adhesives never penetrate into the foam member containing the air bubbles, trouble does not occur when used in environment where water splashes, or during assembly. When the second arrangement is employed, the transmission of vibration from the transmitting ultrasonic sensor to the inside of the case and the transmission of vibration from the inside of the case to the receiving ultrasonic sensor are suppressed by the second foam member.

When the third arrangement is employed, since the matching layer of the ultrasonic sensor (which most violently vibrates) projects outside the case, the vibration transmitted inside the case from the ultrasonic sensor is significantly reduced. According to the fourth arrangement, transmission of the vibration between the matching layer sections of the transmitting and receiving ultrasonic sensors (i.e., direct transmission waves propagated through air) is suppressed by the projection.

According to the fifth arrangement, the ultrasonic wave being emitted from the ultrasonic vibrator toward the inside of the case is reflected by the foam member and is attenuated when transmitted through the foam member. Thus, the direct transmission wave propagated inside the case is attenuated. Further, since water or the like never penetrates into the foam member containing the air bubbles, trouble does not occur when used in an environment where water splashes.

Finally, according to the sixth arrangement, since the acoustic matching layer of the ultrasonic vibrator (which most violently vibrates) projects outside the case, and the ultrasonic wave emitted from the vibrator body to the case is attenuated, the direct transmission wave propagated inside the case is further attenuated.

BRIEF DESCRIPTION OF THE DRAWING(S)

DETAILED DESCRIPTION OF THE PREFERRED EMBODIMENTS

The following embodiments of the present invention are described with reference to the drawings.

Figure 1:
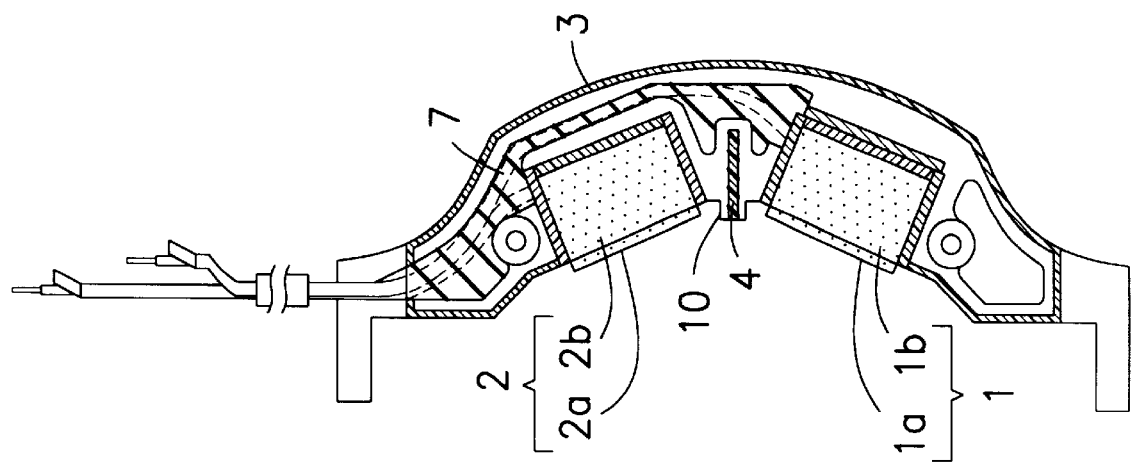
FIG. 1 is a sectional view showing the general arrangement of an ultrasonic range finder according to an embodiment of the present invention.
Figure 2:
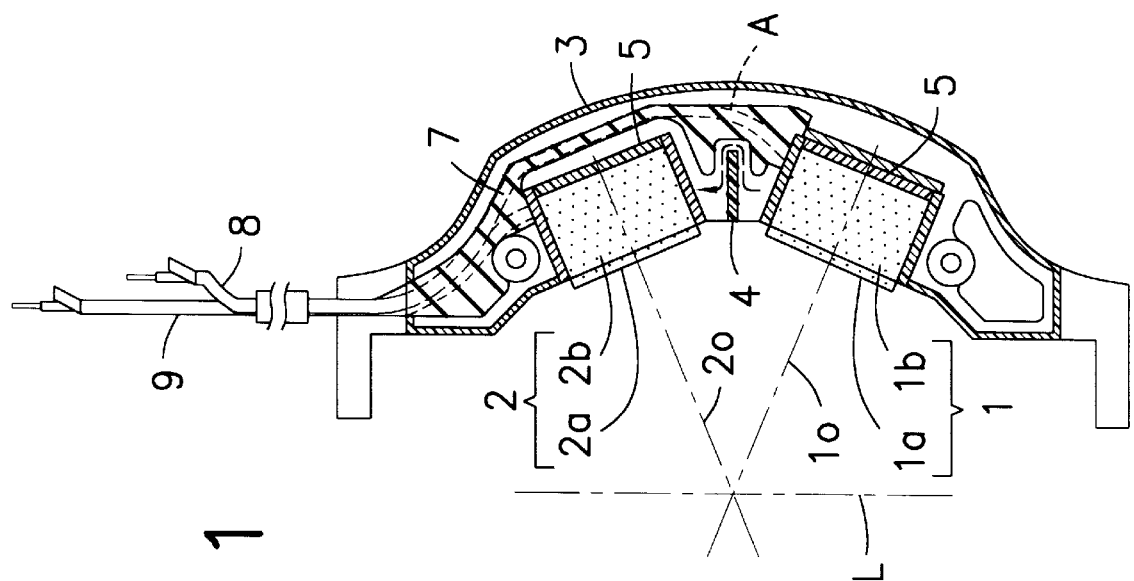
FIG. 2 is a sectional view showing the general arrangement of an ultrasonic range finder according to a variation of the embodiment of FIG. 1.

FIG. 1 is a sectional view showing the general arrangement of an ultrasonic range finder according to an embodiment of the present invention while FIG. 2 is a sectional view showing the general arrangement of an ultrasonic range finder according to a variation of FIG. 1.

The ultrasonic range finder is designed to have a sensing distance range of about 12 mm–30 mm. As shown in FIG. 1, the ultrasonic range finder comprises a transmitting ultrasonic sensor 1 for transmitting ultrasonic waves toward an object to be sensed (not shown), a receiving ultrasonic sensor 2 for receiving reflected waves reflected by the object to be sensed, and a case 3 made of resin for integrally housing and holding both ultrasonic sensors 1 and 2 which are separated and mounted on the same surface. Each of the transmitting and receiving ultrasonic sensors 1 and 2 are arranged to be angled toward each other and held so that the center axes of the sensors 10 and 20 cross at the focal position L (about 17 mm), thereby enhancing the sensitivity at close distances.

In addition, a planar foam member 4 fabricated to contain air bubbles (for example, foam polyethylene having a density of about 0.07 g/cm$^3$) is provided between the transmitting ultrasonic sensor 1 and the receiving ultrasonic sensor 2 within the case 3. One side of the foam member 4 is exposed on a surface of the case 3. The acoustic impedance of foam polyethylene is about 0.2×10$^6$ kg/m$^2$s or less. In addition, each of the matching layer sections constituting the transmitting and receiving ultrasonic sensors 1 and 2, that is, each of the matching layer sections 1a and 2a forming transmission and receiving wave surfaces project beyond the surface of the case 3.

Further, a second foam member 5 fabricated from the same type of material as the foam member 4 is provided around sections 1b and 2b held inside the case 3 of the ultrasonic sensors 1 and 2 so that each of the sections 1b and 2b is covered by the second foam member 5. In FIG. 1, reference number 7 is a filler material such as silicone rubber which fills the case 3. Reference numbers 8 and 9 are wiring cables for the transmitting and receiving sides, respectively. The transmitting wiring cable 8 is connected to the transmitting ultrasonic sensor 1, while the receiving wiring cable 9 is connected to the receiving ultrasonic sensor 2.

As described above, according to the ultrasonic range finder of this embodiment, since the foam member 4 is disposed between the transmitting and receiving ultrasonic sensors 1 and 2, it serves as a bypass route for attenuating vibration. Specifically, vibration emitted from the transmitting ultrasonic sensor 1 and propagating toward the receiving ultrasonic sensor 2 does not transmit through the foam member 4. This is so because the acoustic impedance of the case 3 significantly differs from that of the foam member 4. Thus, the vibration must propagate around the foam member 4, as shown by arrow A in FIG. 1, thereby attenuating the vibration. Water or adhesives cannot penetrate into the foam member 4 containing the air bubbles.

When the sections 1b and 2b of the ultrasonic sensors 1 and 2 held within the case 3 are covered by the second foam member 5, the vibration transmitted from the transmitting ultrasonic sensor 1 to the inside of case 3 and the vibration transmitted from the inside of case 3 to the receiving ultrasonic sensor 2 is suppressed. In addition, when the matching layer sections 1a and 2a project outside the case 3, since the matching layer sections 1a and 2a most violently vibrate, vibrations transmitted from the transmitting and receiving ultrasonic sensors 1 and 2 to the inside of case 3 are significantly reduced.

Although this embodiment is arranged to interpose the foam member 4 between the transmitting and receiving ultrasonic sensors 1 and 2, to project each of the matching layer sections 1a and 2a from the surface of the case 3, and to cover the sections 1b and 2b held within the case 3 of the ultrasonic sensors 1 and 2 with the second foam member 5, all such components need not be employed. Indeed, the direct transmission wave can be suppressed even when the above components are independently employed. However, when the matching layer sections 1a and 2a are projected from the surface of the case 3, the direct transmission wave may be transmitted through the air between these matching layer sections 1a and 2a. Thus, it is effective to employ the arrangement according to the variation as shown in FIG. 2.

The ultrasonic range finder according to the variation of FIG. 2 comprises a transmitting ultrasonic sensor 1, a receiving ultrasonic sensor 2, a case 3 made of resin for holding both ultrasonic sensors 1 and 2 which are separated and mounted on the same surface, matching layer sections 1a and 2a of the transmitting and receiving ultrasonic sensors 1 and 2 which project outward from a surface of the case 3, and a projecting member 10 projecting outward between the ultrasonic sensors 1 and 2 on the surface of the case 3. One side of the foam member 4, provided between the transmitting and receiving ultrasonic sensors 1 and 2 within the case 3, is projected from the surface of the case 3 and held within the projecting member 10. Thus, when this variation is employed, the transmission of vibrations between the matching layer sections 1a and 2a of the transmitting and receiving ultrasonic sensors 1 and 2 (i.e., the transmission of direct transmission waves through air) is suppressed by the projecting member 10.

Figure 3:
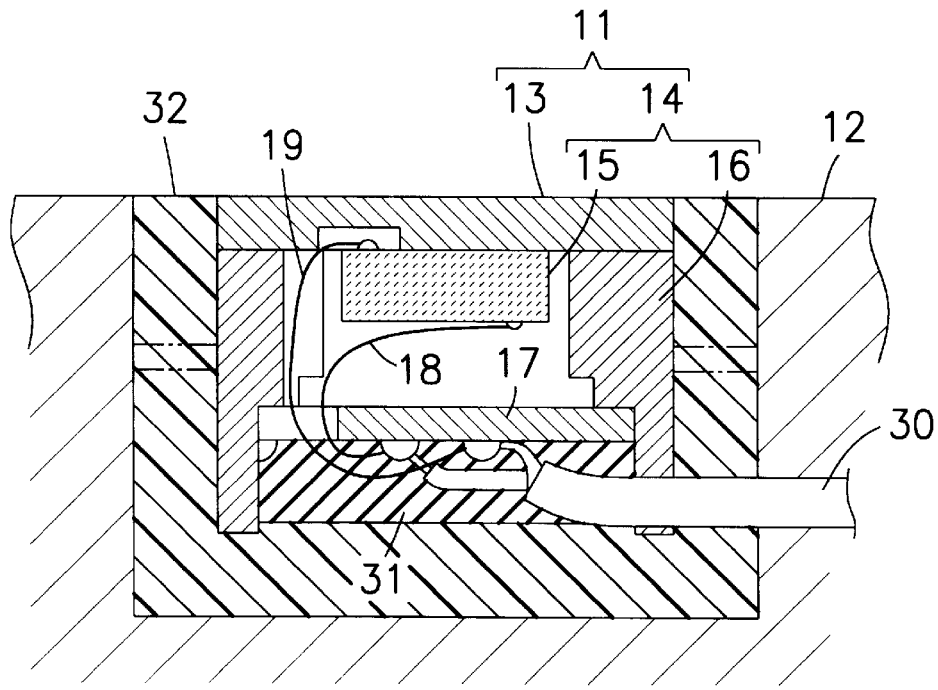
FIG. 3 is a sectional view schematically showing the structure of an ultrasonic sensor according to a first embodiment of the present invention.

FIG. 3 is a sectional view schematically showing the structure of an ultrasonic sensor according to a first embodiment of the present invention. The ultrasonic sensor according to this embodiment comprises an ultrasonic vibrator 11 and a case 12 made of resin for housing and holding the ultrasonic vibrator 11.

The ultrasonic vibrator 11 comprises an acoustic matching layer 13 made of resin, the surfaces of which form an ultrasonic wave transmitting and receiving surface, and a vibrator body 14. The vibrator body 14 comprises a piezoelectric vibrator element 15 bonded to the rear surface of the acoustic matching layer 13, and a metal tube 16 made of, for example, aluminum for housing the piezoelectric vibrator element 15 and supporting the circumferential edge of the rear surface of the acoustic matching layer 13. In FIG. 3, reference number 17 is a base plate disposed in the metal tube 16, reference number 18 is a positive (+) lead wire connected to a surface electrode (not shown) of the piezoelectric vibrator element 11, reference number 19 is a negative (−) lead wire connected to a rear surface electrode (not shown) of the piezoelectric vibrator element 11, reference number 30 is a wiring cable, and reference number 31 is silicone rubber disposed on the rear surface of the base plate 17. The acoustic impedance of the aluminum metal tube 16 is about $14.0 \times 10^6$ kg/m$^2$s.

Further, the ultrasonic vibrator 11 is housed in the case 12 in such a manner that only the top surface of the acoustic matching layer 13 is exposed. The side of the acoustic matching layer 13 and the side and bottom of the vibrator body 14 are surrounded by a foam member 32 containing air bubbles (for example, foam polyethylene having a density of about 0.07 g/cm$^3$ and an acoustic impedance of about $0.2 \times 10^6$ kg/m$^2$s). The foam member 32 is disposed along the entire surface except the top surface of the acoustic matching layer 13 of the ultrasonic vibrator 11 held by the case 12. One surface of the foam member 32 is exposed. Although some surfaces of the ultrasonic vibrator 11 are surrounded by the foam member 32, the side of the metal tube 16 constituting the vibrator body 14 may be supported by projections inside of the case 12 (as shown by the dashed lines in FIG. 3).

In the first embodiment of the ultrasonic sensor, the ultrasonic waves being emitted from the side of the acoustic matching layer 13 of the ultrasonic vibrator 11, and from the side and bottom of the vibrator body 14 toward the inside of case 12 are reflected and attenuated by the foam member 32 before entering the case 12. Thus, the direct transmission wave propagating in the case 12 containing the ultrasonic sensor is attenuated. Since the foam member 32 contains air bubbles, water or the like never penetrates into the air bubbles in the foam member 32 even when one surface of the foam member 32 is exposed.

Figure 4:
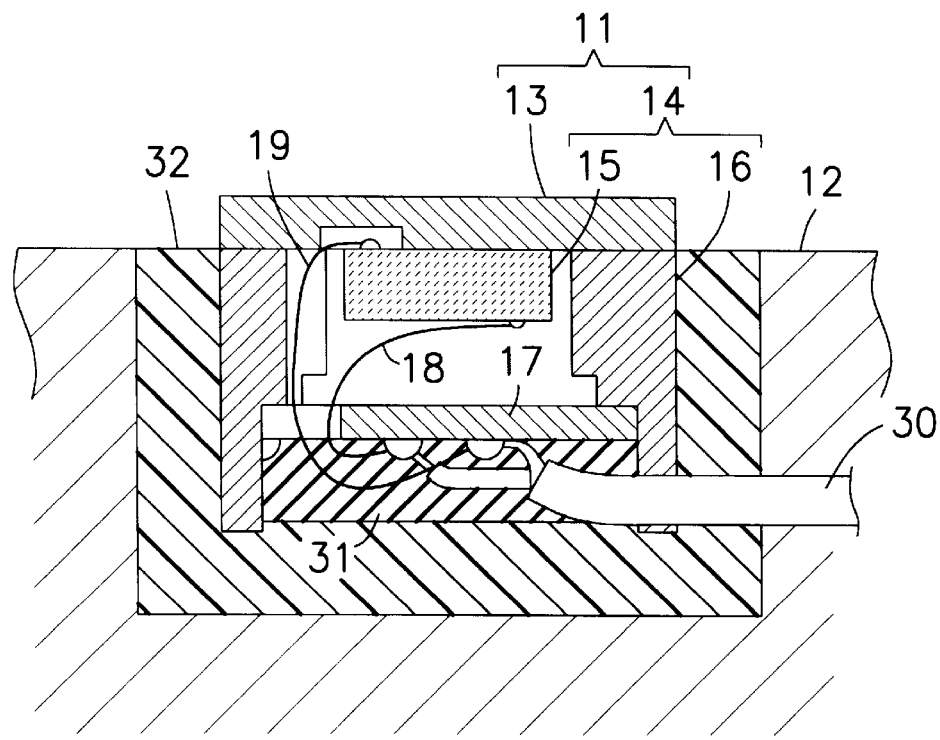
FIG. 4 is a sectional view schematically showing the structure of an ultrasonic sensor according to a second embodiment of the present invention.

FIG. 4 is a sectional view schematically showing the structure of an ultrasonic sensor according to the second embodiment of the present invention. Since the structure of the ultrasonic sensor according to this embodiment does not essentially differ from the first embodiment, the same reference numbers are used for components of FIG. 4 corresponding to those of FIG. 3 and a detailed description of these components is omitted.

The ultrasonic sensor according to this embodiment comprises an ultrasonic vibrator 11 comprising an acoustic matching layer 13 and a vibrator body 14, a case 12 for housing and holding the vibrator body 14 of the ultrasonic vibrator 11 in which the sides of the acoustic matching layer 13 are also exposed. The outer periphery of the vibrator body 14 housed in the case 12 is surrounded by foam member 32 which contains air bubbles. The case 12 houses a metal tube 16 which constitutes the vibrator body 14 having an acoustic impedance significantly different from that of the resin material. The foam material 32 is interposed between the vibrator body 14 and the case 12. The acoustic impedance the aluminum constituting the metal tube 16 is about $14.0 \times 10^6$ kg/m$^2$s, while the acoustic impedance of the foam member is about $0.2 \times 10^6$ kg/m$^2$s or less.

Since the second embodiment of the ultrasonic sensor employs a structure where the matching layer 13 of the ultrasonic sensor 11 (which most violently vibrates) projects outside the case, the case 12 encloses only the vibrator body 14 therein, and the vibrator body 14 is surrounded by the foam member 32 having a significantly different acoustic impedance, most of the ultrasonic wave energy being emitted from the vibrator body 14 toward the inside of case 12 is reflected by the foam member 32 and the ultrasonic wave transmitting through the foam member 32 is significantly attenuated. Thus, the direct transmission wave propagating within the case 12 is attenuated more than in the first embodiment of the ultrasonic sensor.

Figure 5:
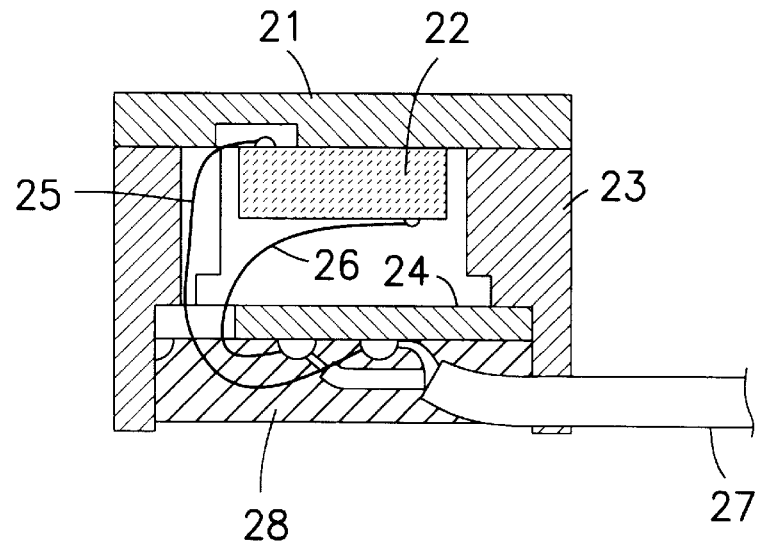
FIG. 5 is a sectional view schematically showing the entire structure of an ultrasonic vibrator according to an embodiment of the present invention.

FIG. 5 is a sectional view schematically showing the structure of an ultrasonic vibrator. The ultrasonic vibrator comprises an acoustic matching layer 21, a piezoelectric vibrator element 22 and a support tube 23 which are bonded to one surface (the rear surface in the figure) by using adhesives (not shown). The surface of the acoustic matching layer 21 serves as an ultrasonic wave transmitting and receiving surface. The acoustic matching layer 21 is fabricated from a resin material such as Noryle or ABS which have an acoustic impedance of about $1.5-1.8 \times 10^6$ kg/m$^2$s.

As in the conventional example, the thickness of the acoustic matching layer 21 is designed to correspond to a quarter wavelength of the ultrasonic wave. The support tube 23 is fabricated from metal such as aluminum and supports the circumferential edge of the acoustic matching layer 21. In FIG. 5, reference number 24 is a base plate disposed in the support tube 23, reference number 25 is a negative (−) lead wire connected to a surface electrode (not shown) of the piezoelectric vibrator element 21, reference number 26 is a positive (+) lead wire connected to a rear surface electrode (not shown) of the piezoelectric vibrator element 21, reference number 27 is a wiring cable, and reference number 28 is silicone rubber disposed on the rear surface of the base plate 24.

Figure 6:
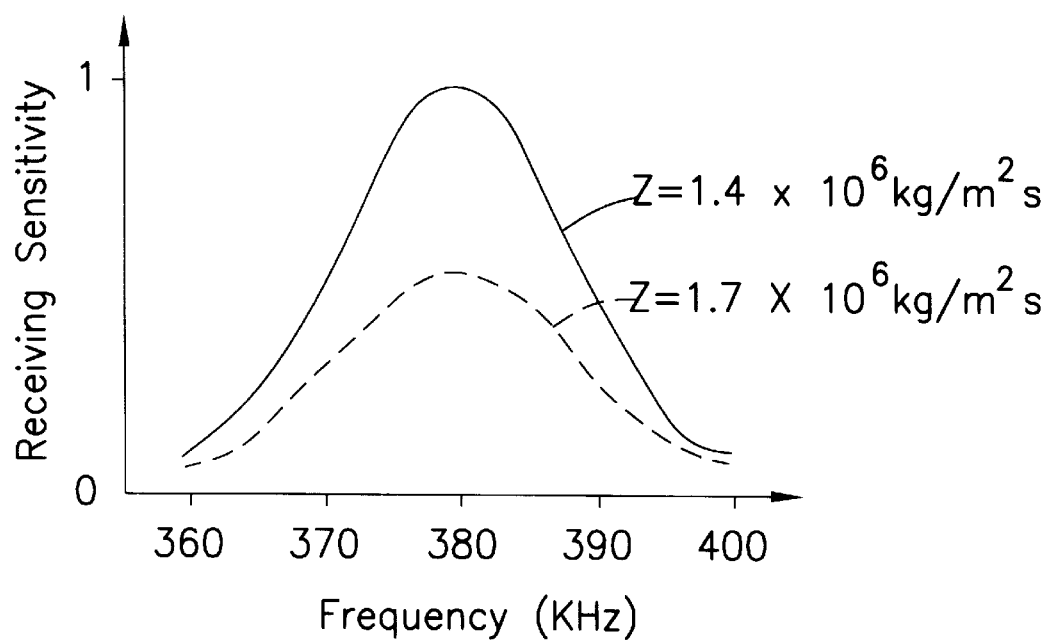
FIG. 6 is a graph illustrating the results of an investigation of receiving sensitivities of ultrasonic vibrators according to an embodiment of the present invention and a conventional example.
Figure 7:
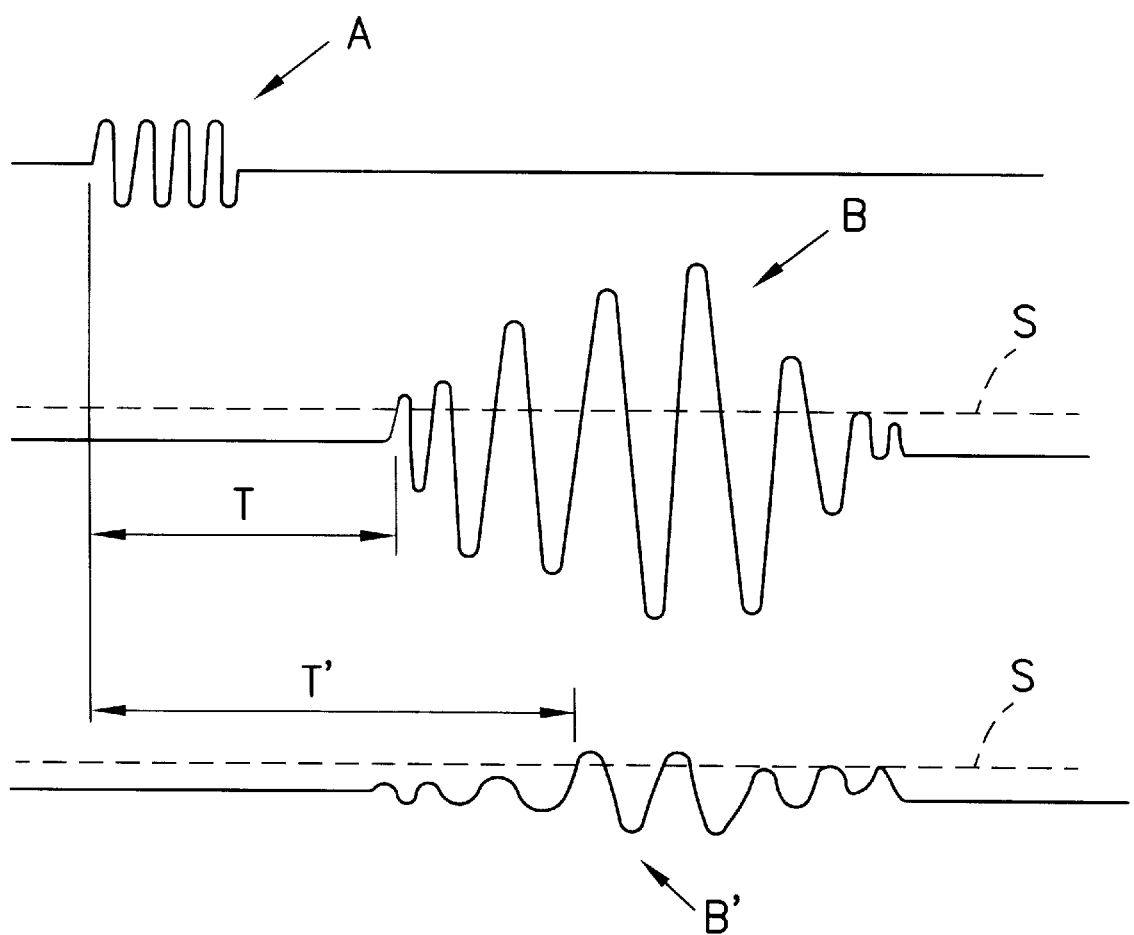
FIG. 7 is a chart illustrating the delay of reflecting times in the conventional example.

When an investigation is made regarding the receiving sensitivity of an ultrasonic vibrator which uses an acoustic matching layer 21 having an acoustic impedance Z of about $1.7 \times 10^6$ kg/m$^2$s, readings which are shown by the dashed line of FIG. 6 result. Thus, according to the results of the investigation, it is revealed that the sensitivity has less variation when the acoustic matching layer 21 has an acoustic impedance of about $1.7 \times 10^6$ kg/m$^2$s as compared with the conventional example using an acoustic impedance of about $1.4 \times 10^6$ kg/m$^2$s.

When the acoustic matching layer 21 is fabricated from resin materials such as Noryle or ABS, variations in sensitivity of the ultrasonic sensor due to frequency shifting are reduced and distance calculation accuracy is improved without requiring measures (1) or (3) described above for the conventional example. In measuring close distances, no problems arise despite the lower sensitivity because the ultrasonic wave is less attenuated. On the contrary, the relative error rate is increased (even for the same time error) as the reflecting time is shortened. Therefore, the ultrasonic vibrator according to the present invention, that is, the ultrasonic vibrator having flat sensitivity is more favorable than the ultrasonic vibrator of the structure of the conventional example having peak sensitivity at a particular frequency.

According to the first arrangement of the present invention, since the foam member 4 fabricated to contain air bubbles is interposed between the transmitting and receiving ultrasonic sensors 1 and 2, the foam member 4 serves as a bypass route for attenuating mechanical vibration of the transmitting ultrasonic sensor 1, so that the influence of a direct transmission wave propagated through the case 3 can be effectively suppressed. Since water or adhesives never penetrate into the foam member 4 containing the air bubbles, no trouble occurs when used in environment where water splashes, or during assembly. When the second arrangement is employed, transmission of vibrations from the transmitting ultrasonic sensor 1 to inside of the case 3 and transmission of vibrations from the inside of the case 3 to the receiving ultrasonic sensor 2 is suppressed by the second foam member 5. Thus, detrimental influence of the direct transmission wave is suppressed.

When the third arrangement is employed, since the matching layer 13 of the ultrasonic sensor 11 (which most violently vibrates) projects outside the case 12, the vibration transmitted inside the case 12 from the ultrasonic sensor 11 is significantly reduced. According to the fourth arrangement, the transmission of vibrations between the matching layer sections 1a, 2a of the transmitting and receiving ultrasonic sensors 1, 2 (i.e., direct transmission waves propagated through the air) are suppressed by the projecting member 10.

In the first ultrasonic sensor according to the present invention, the ultrasonic wave emitted from the ultrasonic vibrator 11 toward the inside of the case 12 is reflected and attenuated by the foam member 32 so that the direct transmission wave propagated inside the case 12 is sufficiently attenuated. Water or the like never penetrates into the foam member 32 containing the air bubbles, and trouble does not occur when used in an environment where water splashes.

According to the second ultrasonic sensor, the acoustic matching layer 13 of the ultrasonic vibrator 11 which provides the ultrasonic wave transmitting and receiving surface projects beyond the case and the ultrasonic wave emitted inside the case 12 is attenuated since the vibrator body 14 of the ultrasonic vibrator 11 is surrounded by the foam member 32, an advantage is obtained in that the direct transmission wave propagated inside the case 12 is further attenuated.

According to the ultrasonic vibrator of the present invention, it is possible to obtain the advantages of reduced variation of sensitivity due to frequency shifting and improved distance measurement accuracy. In addition, there is no need to adjust the frequency or to correct for temperature variation thereby reducing the cost of the transmitting and receiving circuits.

What is claimed is:

1. An ultrasonic range finder comprising:
    a transmitting ultrasonic sensor, a receiving ultrasonic sensor, and a case for holding the ultrasonic sensors;
    a first foam member fabricated to contain separate air bubbles which is provided between the ultrasonic sensors within the case and has an acoustic impedance different from an acoustic impedance of the case;
    a first acoustic matching layer for the transmitting sensor and a second acoustic matching layer for the receiving ultrasonic sensor, both acoustic matching layers projecting outward from the surface of the case; and
    a projecting member including a portion of said first foam member which projects outward from the surface of the case between the ultrasonic sensors and between the first and second acoustic matching layers.

2. The ultrasonic range finder of claim 1, wherein said first foam member is foam polyethylene having a density of about 0.07 g/cm$^3$.

3. The ultrasonic range finder of claim 1, wherein said first foam member has an acoustic impedance of about $0.2 \times 10^6$ kg/m$^2$s or less.

4. The ultrasonic range finder as set forth in claim 1, wherein a second foam member and a third, foam member which are separate from said first foam member and are fabricated to contain separate air bubbles and surround sections of the respective transmitting and receiving ultrasonic sensors held in the case.

5. The ultrasonic range finder of claim 4, wherein said second foam member is foam polyethylene having a density of about 0.07 g/cm$^3$.

6. The ultrasonic range finder of claim 4, wherein said second foam member has an acoustic impedance of about $0.2 \times 10^6$ kg/m$^2$s or less.

7. The ultrasonic range finder of claim 1, wherein at least one of said first and second acoustic matching layers comprises a resin material having an acoustic impedance of about $1.5-1.8 \times 10^6$ kg/m$^2$s.

8. The ultrasonic range finder of claim 7, wherein at least one of said first and second acoustic matching layers comprise one resin selected from the group consisting of Noryle and ABS.

9. The ultrasonic range finder of claim 1, wherein said first foam member is provided only between said ultrasonic sensors.

10. The ultrasonic range finder of claim 1, wherein said projecting member is comprised of a portion of said case which projects outward from said surface of said case, and a portion of said first foam member corresponding thereto.

11. An ultrasonic sensor comprising:
    an ultrasonic vibrator comprising an acoustic matching layer, a vibrator body, and a case for housing and holding the vibrator body of the ultrasonic vibrator; in which
    at least the top surface of the acoustic matching layer is exposed;
    a foam member containing separate air bubbles and having an acoustic impedance different from an acoustic impedance of the case is arranged near the vibrator body housed in said case; and
    a projecting member including a portion of said foam member projects outward from the surface of the case adjacent to the ultrasonic vibrator for suppressing transmission of vibrations from said ultrasonic vibrator.

12. The ultrasonic sensor of claim 11, wherein said foam member is produced from foam polyethylene having a density of about 0.07 g/cm$^3$.

13. The ultrasonic sensor of claim 11, wherein said foam member has an acoustic impedance of about $0.2 \times 10^6$ kg/m$^2$s or less.

14. The ultrasonic sensor of claim 11, in which the sides of the acoustic matching layer are also exposed.

15. The ultrasonic range finder of claim 14, wherein said projecting member projects outward between said acoustic matching layers.

16. The ultrasonic range finder of claim 11, wherein said projecting member is comprised of a portion of said case which projects outward from said surface of said case, and a portion of said foam member corresponding thereto.

17. An ultrasonic range finder comprising, a transmitting ultrasonic sensor, a receiving ultrasonic sensor, and a case for holding the ultrasonic sensors;

a first foam member fabricated to contain separate air bubbles provided between the ultrasonic sensors within the case and having an acoustic impedance different from an acoustic impedance of the case; and a projecting member including a portion of said first foam member which projects outward from the surface of the case between the ultrasonic sensors.

18. The ultrasonic range finder of claim 17, wherein said projecting member is comprised of a portion of said case which projects outward from said surface of said case, and a portion of said first foam member corresponding thereto.

* * * * *